US012610132B2

(12) United States Patent
    Kawai

(10) Patent No.:  US 12,610,132 B2
(45) Date of Patent:  Apr. 21, 2026

(54) DISPLAY APPARATUS, CONTROL METHOD THEREOF AND STORAGE MEDIUM

(71) Applicant: CANON KABUSHIKI KAISHA, Tokyo (JP)

(72) Inventor: Yoshikazu Kawai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 100 days.

(21) Appl. No.: 18/442,340

(22) Filed: Feb. 15, 2024

(65) Prior Publication Data

US 2024/0284033 A1      Aug. 22, 2024

(30) Foreign Application Priority Data

Feb. 21, 2023    (JP) ................................ 2023-025529

(51) Int. Cl.
    *H04N 23/63*       (2023.01)
    *H04N 23/62*       (2023.01)
    *H04N 23/661*      (2023.01)
    *H04N 23/90*       (2023.01)

(52) U.S. Cl.
    CPC ........... *H04N 23/631* (2023.01); *H04N 23/62* (2023.01); *H04N 23/661* (2023.01); *H04N 23/90* (2023.01)

(58) Field of Classification Search
    CPC .... H04N 23/631; H04N 23/661; H04N 23/90; H04N 23/62
    USPC ....................................... 348/211.3
    See application file for complete search history.

(56) References Cited

U.S. PATENT DOCUMENTS

2023/0308778 A1*   9/2023  Yang .................... H04N 23/959

FOREIGN PATENT DOCUMENTS

JP            6938917 B2      9/2021
JP          2022111235 A      7/2022

* cited by examiner

*Primary Examiner* — Joel W Fosselman
(74) *Attorney, Agent, or Firm* — Cowan, Liebowitz & Latman, P.C.

(57)                    ABSTRACT

A display apparatus that is communicable with a plurality of devices includes a display having a touch panel, and a control unit configured to control to transmit an instruction for causing a first device of the plurality of devices to perform a first operation when a user touches a first position of the touch panel, and cause the display to display a menu for selecting a second device different from the first device from the plurality of devices when the user touches a second position of the touch panel while touching the first position of the touch panel.

9 Claims, 11 Drawing Sheets

F I G. 2

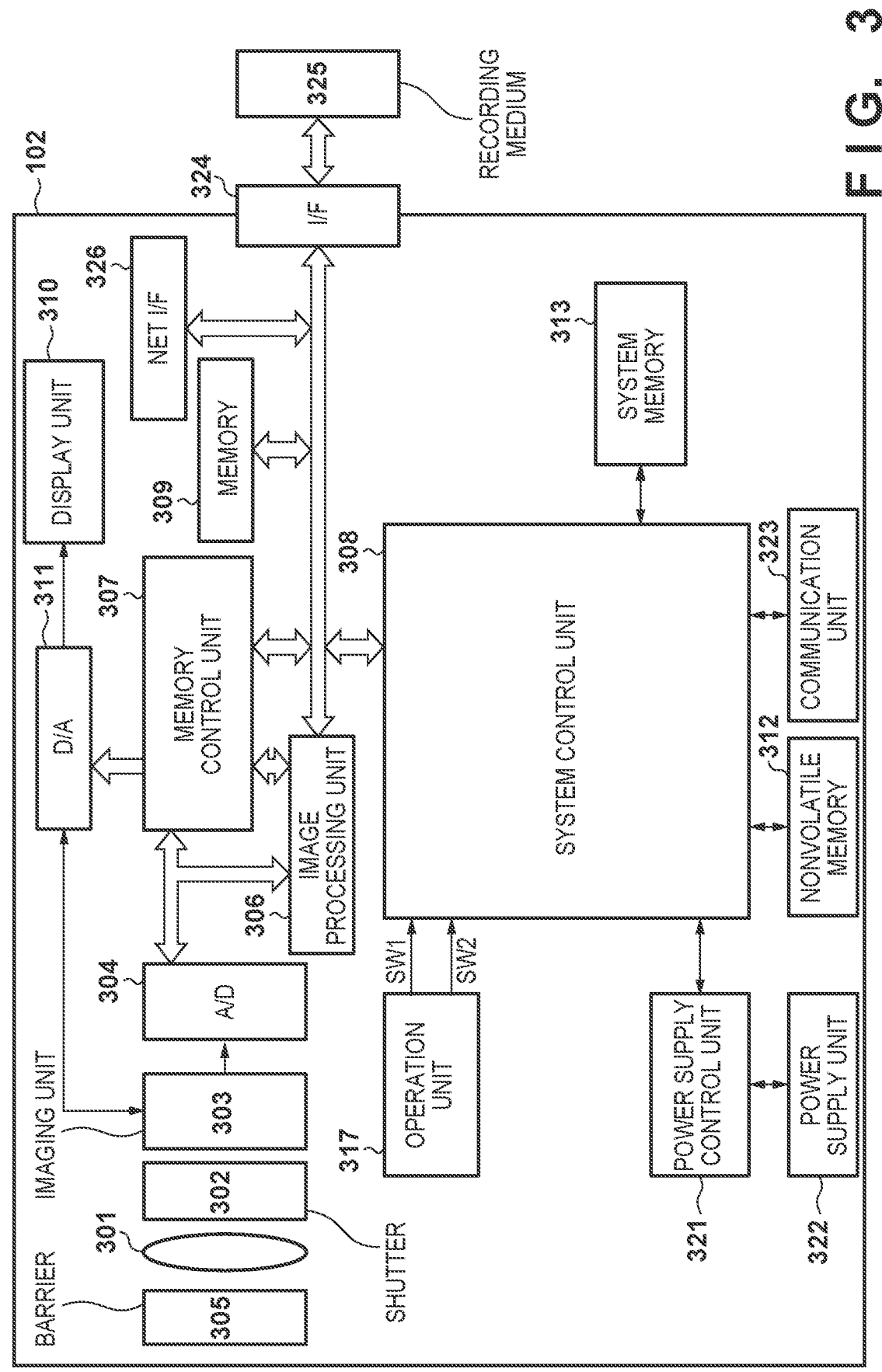
F I G. 3

Figure 5C:
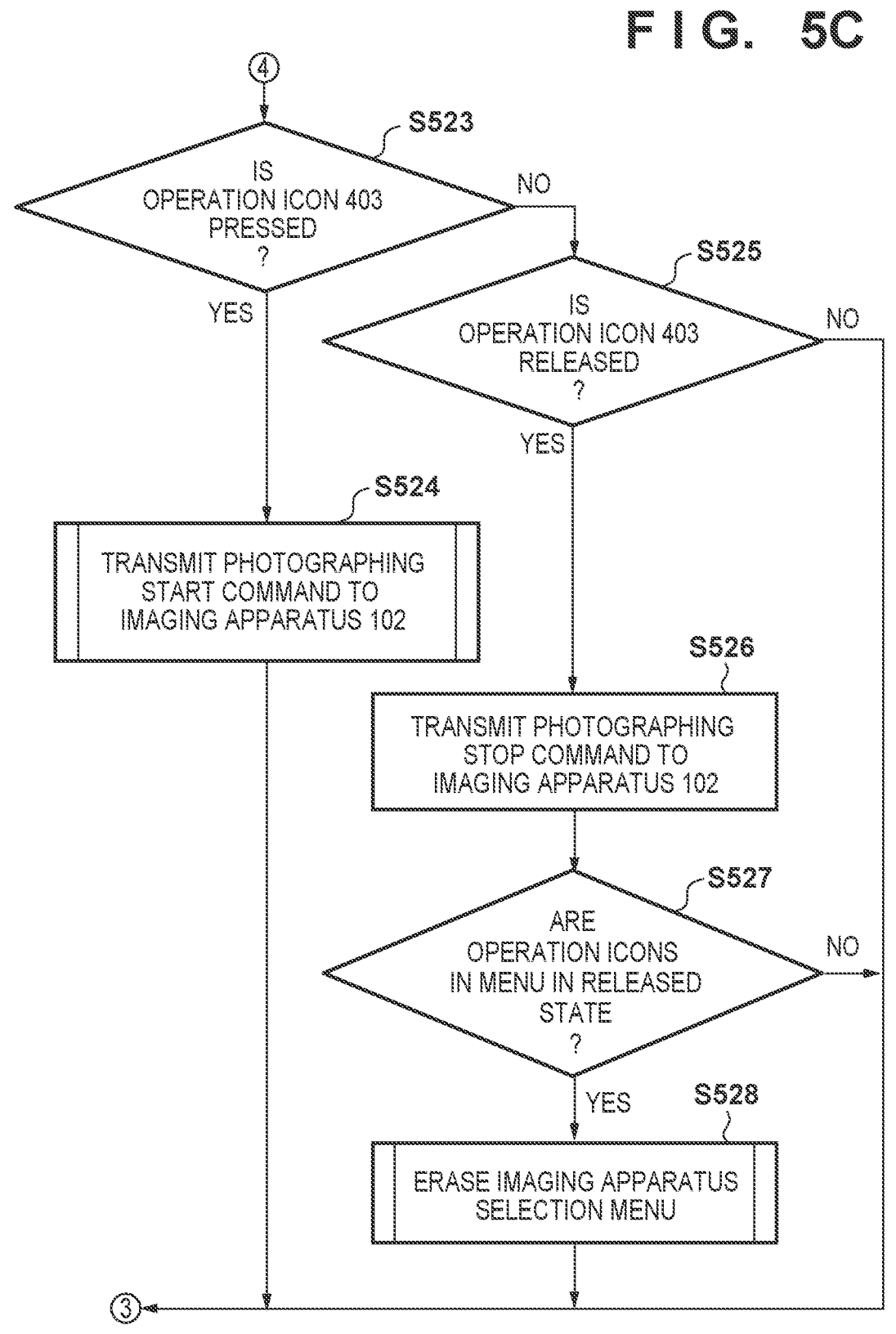

IS
OPERATION ICON 403
PRESSED
?

NO

YES

S525

IS
OPERATION ICON 403
RELEASED
?

NO

YES

S524

TRANSMIT PHOTOGRAPHING
START COMMAND TO
IMAGING APPARATUS 102

S526

TRANSMIT PHOTOGRAPHING
STOP COMMAND TO
IMAGING APPARATUS 102

S527

ARE
OPERATION ICONS
IN MENU IN RELEASED
STATE
?

NO

YES          S528

ERASE IMAGING APPARATUS
SELECTION MENU

③

F I G. 6A
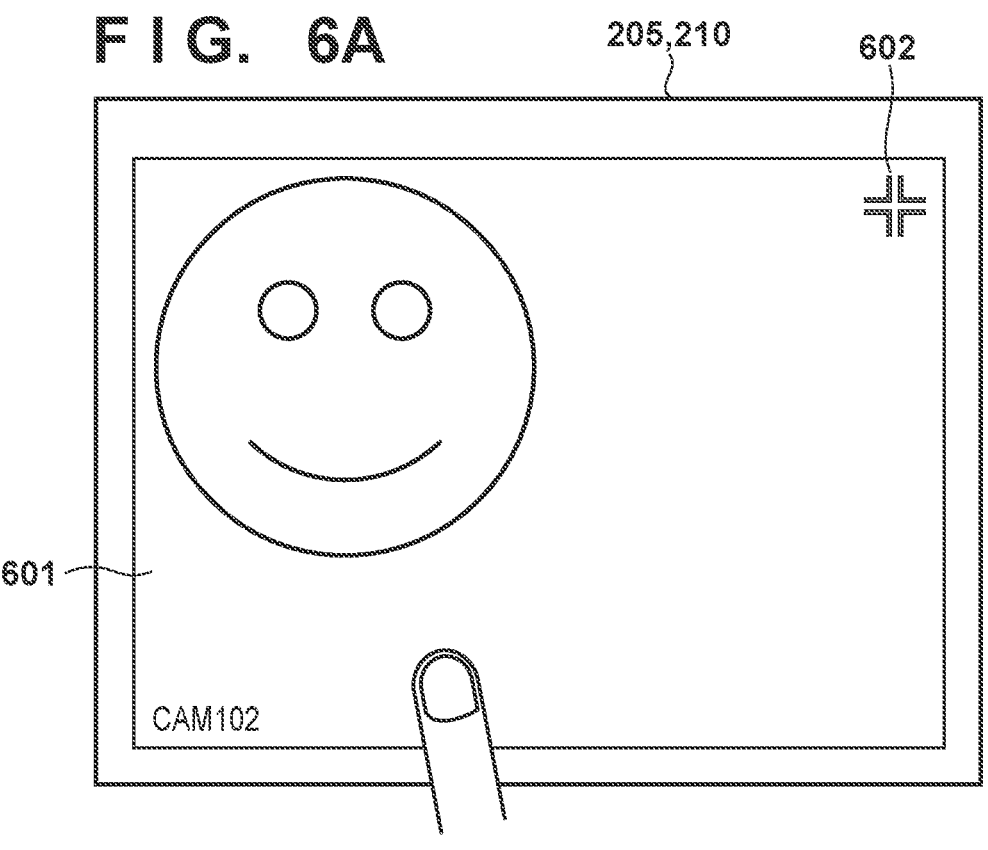
F I G. 6B
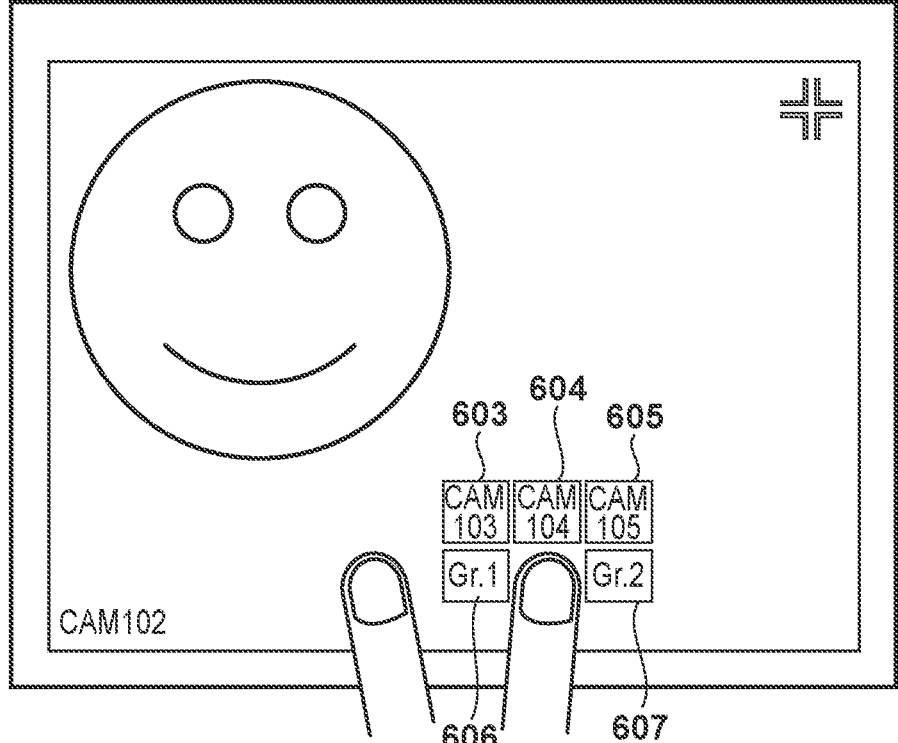

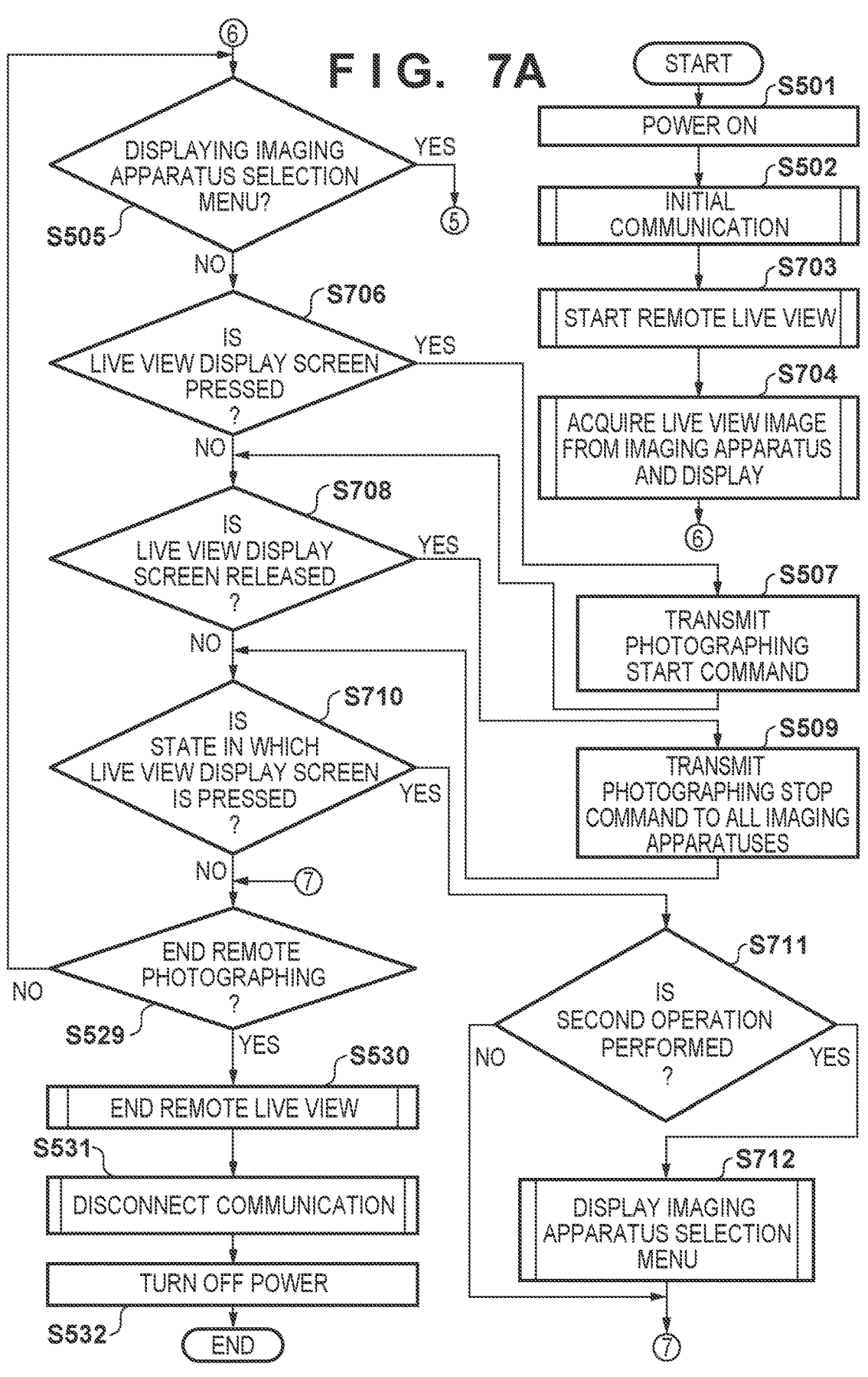
F I G. 7A

DISPLAY APPARATUS, CONTROL METHOD THEREOF AND STORAGE MEDIUM

BACKGROUND OF THE INVENTION

Field of the Invention

The present invention relates to a display apparatus for controlling a plurality of devices.

Description of the Related Art

There is known a system that performs remote photographing by remotely controlling an imaging apparatus such as a digital camera from one computer having a touch panel. In recent years, there is also a system that controls remote photographing by a plurality of cameras by a touch operation on one computer, and scenes where one person controls a plurality of cameras are also increasing. In order to control a plurality of cameras by a touch operation, various improvement measures such as contrivance of a display layout are indispensable to enable more efficient input of a touch operation.

As a known technique for making the touch operation diverse and improving efficiency, Japanese Patent No. 6938917 discloses a technique in which a specific operation is performed on an operation button to cause another operation button for performing control related to the operation button to appear, thereby urging a user to make a selection. In addition, Japanese Patent Laid-Open Publication No. 2022-111235 discloses a technique in which an operation type is determined by a touch area which is first touched, and an operation amount to be controlled is determined by the number of fingers to be subsequently touched.

In the system that controls the plurality of cameras as described above, for example, there is a case where it is necessary to perform an operation of performing photographing with the second camera without stopping the photographing action of the first camera. In this case, in the known technique described above, it is difficult to perform other controls while continuing the control by the first operation.

For example, in a method of causing another button to appear by a specific operation on the button, it is necessary to perform a specific operation from a time point when the button operation is started, and there is a problem that the button cannot appear from the middle after the operation other than the specific operation is started.

In addition, in the method of changing control according to the number of fingers to touch, there is a problem in that control of types more than the number of fingers cannot be performed.

SUMMARY OF THE INVENTION

The present invention has been made in view of the above-described problems, and provides a display apparatus that enables operation of another device while continuing control of a certain device.

According to a first aspect of the present invention, there is provided a display apparatus that is communicable with a plurality of devices, the display apparatus comprising: a display having a touch panel; and at least one processor or circuit configured to function as: a control unit configured to control to transmit an instruction for causing a first device of the plurality of devices to perform a first operation when a user touches a first position of the touch panel, and cause the display to display a menu for selecting a second device different from the first device from the plurality of devices when the user touches a second position of the touch panel while touching the first position of the touch panel.

According to a second aspect of the present invention, there is provided a method for controlling a display apparatus including a display having a touch panel and being communicable with a plurality of devices, the method comprising: controlling to transmit an instruction for causing a first device among the plurality of devices to perform a first operation when a user touches a first position of the touch panel, and cause the display to display a menu for selecting a second device different from the first device from the plurality of devices when the user touches a second position of the touch panel while touching the first position of the touch panel.

Further features of the present invention will become apparent from the following description of exemplary embodiments with reference to the attached drawings.

BRIEF DESCRIPTION OF THE DRAWINGS

FIG. 2 is a block diagram illustrating a configuration of a display apparatus.

FIG. 3 is a block diagram illustrating a configuration of an imaging apparatus.

FIGS. 5A to 5C are flowcharts showing an operation of remote photographing in the first embodiment.

FIGS. 6A and 6B are diagrams illustrating a display example of a display apparatus according to a second embodiment.

FIGS. 7A to 7C are flowcharts showing an operation of remote photographing in the second embodiment.

DESCRIPTION OF THE EMBODIMENTS

Figure 1:
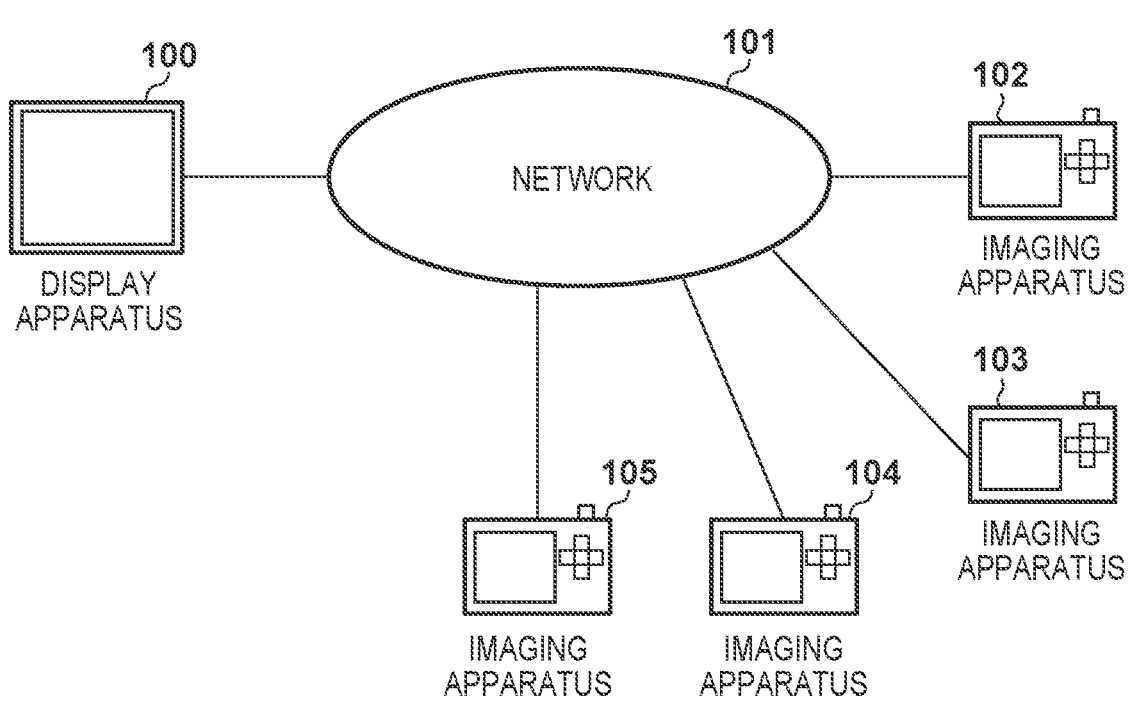
FIG. 1 is a diagram illustrating a configuration of an imaging system that controls a plurality of imaging apparatuses from one display apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a diagram illustrating a configuration of an imaging system that controls a plurality of imaging apparatuses from one display apparatus according to a first embodiment of the present invention.

In the present embodiment, as illustrated in FIG. 1, a display apparatus 100 is communicably connected to a plurality of imaging apparatuses 102 to 105 via a network 101. The display apparatus 100 communicates with the imaging apparatuses 102 to 105 using a protocol that can transfer information using the network 101. As a result, it becomes possible to instruct and set a photographing action for each imaging apparatus by remote control. For convenience of description, FIG. 1 illustrates an example in which four imaging apparatuses are connected to the display apparatus 100.

Figure 2:
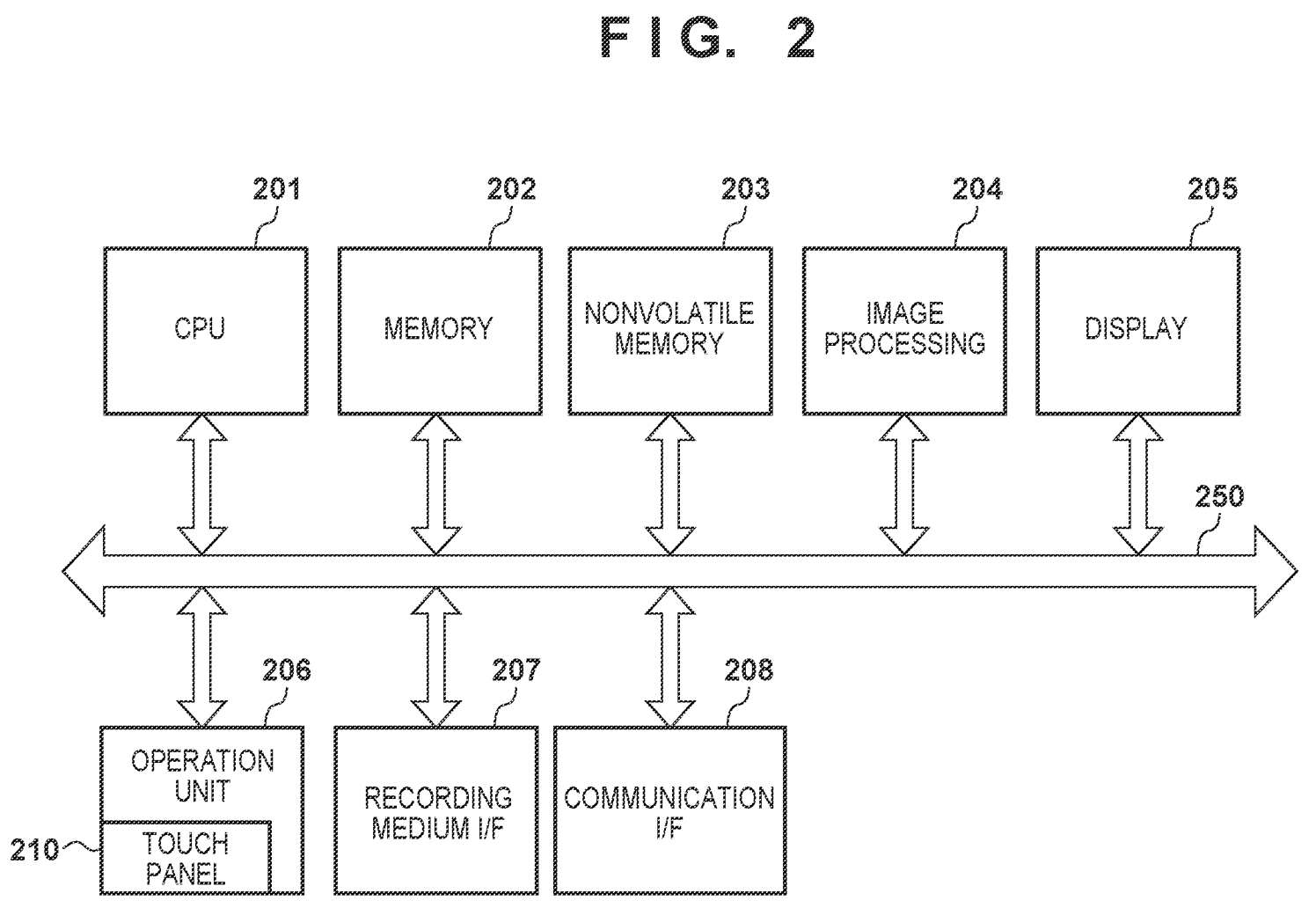

FIG. 2 is a diagram illustrating a configuration example of the display apparatus 100. The display apparatus 100 includes a personal computer, a smartphone (hereinafter, PC), or the like including a display having a touch panel. In FIG. 2, a CPU 201, a memory 202, a nonvolatile memory 203, an image processing unit 204, a display 205, an operation unit 206, a recording medium I/F 207, and a communication I/F 208 are connected to an internal bus 250. The units connected to the internal bus 250 can exchange data with each other via the internal bus 250.

The CPU 201 controls each unit of the display apparatus 100 using the memory 202 as a work area according to a program stored in, for example, the nonvolatile memory 203. The memory 202 includes, for example, a RAM and the like, and includes a work area of the CPU 201, a save area of data at the time of error processing, a load area of a control program, and the like. The nonvolatile memory 203 stores various control programs and data for the CPU 201 to operate. The nonvolatile memory 203 includes, for example, a ROM or the like.

The image processing unit 204 performs various types of image processing on image data and the like acquired via the nonvolatile memory 203, the recording medium I/F 207, and the communication I/F 208 under the control of the CPU 201. The image processing performed by the image processing unit 204 includes A/D conversion processing, D/A conversion processing, encoding processing, compression processing, decoding processing, enlargement/reduction processing, noise reduction processing, color conversion processing, and the like. The image processing unit 204 may include a dedicated circuit block for performing specific image processing. In addition, depending on the type of image processing, the CPU 201 can execute image processing according to a program without using the image processing unit 204.

The display 205 displays an image, an icon, a message, a menu, and other graphical user interface (GUI) screens, for example, under the control of the CPU 201. The CPU 201 generates a display control signal according to a program, and controls each unit of the display apparatus 100 so as to output a video signal for display to the display 205. Note that the configuration of the display apparatus 100 may be up to an interface for outputting a video signal for display to the display 205, and the display 205 may be configured by an external monitor.

The operation unit 206 includes a character information input device such as a keyboard, a pointing device such as a mouse or a touch panel, a button, a dial, a joystick, a touch sensor, a touch panel, and the like, and functions as an input device that accepts a user operation. In the present embodiment, the touch panel 210 included in the operation unit 206 is arranged on the display screen of the display 205.

The touch panel 210 can detect the following operations performed on the touch panel by the user.

Touching the touch panel 210 with a finger or a pen. (hereinafter referred to as touch-down)

The touch panel 210 remains touched with a finger or a pen (hereinafter referred to as touch-on)

A finger or a pen touching the touch panel 210 is released (hereinafter referred to as touch-up)

State in which the touch panel 210 is not touched at all (hereinafter referred to as touch-off)

These operations and position coordinates at which the user is touching the touch panel 210 are notified to the CPU

201 via the internal bus 250. The CPU 201 determines what kind of operation has been performed on the touch panel 210 based on the notified information.

The touch panel 210 may use any method of various methods such as a resistive film method, a capacitance method, a surface acoustic wave method, an infrared method, an electromagnetic induction method, an image recognition method, and an optical sensor method.

A recording medium such as a memory card, a CD, or a DVD can be attached to the recording medium interface (I/F) 207, and data reading and data writing of the attached recording medium are performed under the control of the CPU 201.

The communication interface (I/F) 208 is connected to an external apparatus or the Internet by a wired cable or wirelessly, and transmits and receives various data such as image data, an audio signal, a file, and a command. In the present embodiment, the display apparatus 100 receives image data such as a live view image from the imaging apparatuses 102 to 105 via the communication I/F 208, and transmits commands such as a photographing start command, a photographing preparation start command, and a photographing stop command to the imaging apparatuses 102 to 105.

FIG. 3 is a block diagram for explaining a configuration example of the imaging apparatus 102. The imaging apparatuses 103, 104, and 105 also have the same configuration.

A photographing lens 301 is a photographing optical system including a focus lens. The shutter 302 switches between a state in which light is guided to the imaging unit 303 and a state in which light is blocked, and also has an aperture function. The imaging unit 303 includes an imaging element such as a CCD or a CMOS sensor that converts an optical image into an electric signal. An A/D converter 304 converts an analog signal output from the imaging unit 303 into a digital signal.

The barrier 305 covers the photographing lens 301 and the like to prevent contamination or damage of the imaging system including the photographing lens 301, the shutter 302, and the imaging unit 303.

The image processing unit 306 performs resizing processing such as predetermined pixel interpolation and reduction, and color conversion processing on the image data from the A/D converter 304 or the image data from the memory control unit 307. Furthermore, the image processing unit 306 performs predetermined calculation processing using the imaged image data, and the system control unit 308 performs exposure control and distance measurement control based on the calculation result.

The image data output from the A/D converter 304 is written in the memory 309 via the image processing unit 306 and the memory control unit 307 or only via the memory control unit 307.

The memory 309 stores image data obtained by the imaging unit 303 and converted into digital data by the A/D converter 304, or image data to be displayed on the display unit 310. The memory 309 has sufficient storage capacity for storing a predetermined number of still images, or a moving image and sound of a predetermined time. The memory 309 also serves as a memory (video memory) for image display.

The D/A converter 311 converts the image data for display stored in the memory 309 into an analog signal and supplies the analog signal to the display unit 310. The image data for display written in the memory 309 is displayed by the display unit 310 via the D/A converter 311. The display unit 310 performs display according to the analog signal from the D/A converter 311 on a display, such as an LCD.

The nonvolatile memory 312 is an electrically erasable/recordable memory, and for example, an EEPROM or the like is used. The nonvolatile memory 312 stores constants, control programs, and the like for operation of the system control unit 308.

The system control unit 308 controls the entire imaging apparatus 102. The system control unit 308 controls the entire imaging apparatus 102 by executing a program stored in the nonvolatile memory 312.

For example, a RAM is used as the system memory 313, and constants and variables for operation of the system control unit 308, a program read from the nonvolatile memory 312, and the like are developed.

The operation unit 317 is an operation means configured to input various operation instructions to the system control unit 308, and the user operates the operation unit 317 and inputs various commands to the imaging apparatus 102. The operation unit 317 may include a button or a controller wheel, or may include a touch panel provided on the display unit 310.

A release button is also arranged on the operation unit 317. A first shutter switch signal SW1 serving as a photographing preparation instruction is output by so-called half-pressing of the release button, and a second shutter switch signal SW2 serving as a photographing instruction is output by so-called full-pressing.

Upon receiving the second shutter switch signal SW2, the system control unit 308 starts the operation of a series of photographing processing from reading of a signal from the imaging unit 303 to writing of image data to the recording medium 325. The system control unit 308 controls each component of the imaging apparatus 102 based on the pulse signal.

A power supply control unit 321 includes a battery detection circuit, a DC-DC converter, a switch circuit for switching a block to energize, and the like. The power supply control unit 321 detects whether or not the battery is attached, the type of the battery, and the remaining battery level. In addition, the power supply control unit 321 controls the DC-DC converter based on the detection result and the instruction of the system control unit 308, and supplies a necessary voltage to each component including the recording medium 325 for a necessary period.

The power supply unit 322 includes a primary battery such as an alkaline battery or a lithium battery, a secondary battery such as an NiCd battery, an NiMH battery or an Li-ion battery, an AC adapter, and the like.

The communication unit 323 transmits the image stored in the recording medium 325 to an external apparatus.

The interface 324 is an interface with the recording medium 325. The recording medium 325 includes a semiconductor memory, a magnetic disk, or the like.

The network interface (I/F) 326 is controlled by the system control unit 308 and performs communication via the network. The network I/F 326 enables communication with the display apparatus 100 via the network 101. Note that, in the present embodiment, since the imaging apparatus 102 operates by operation from the display apparatus 100, the display unit 310 and the operation unit 317 may not necessarily be provided.

Figure 4A:
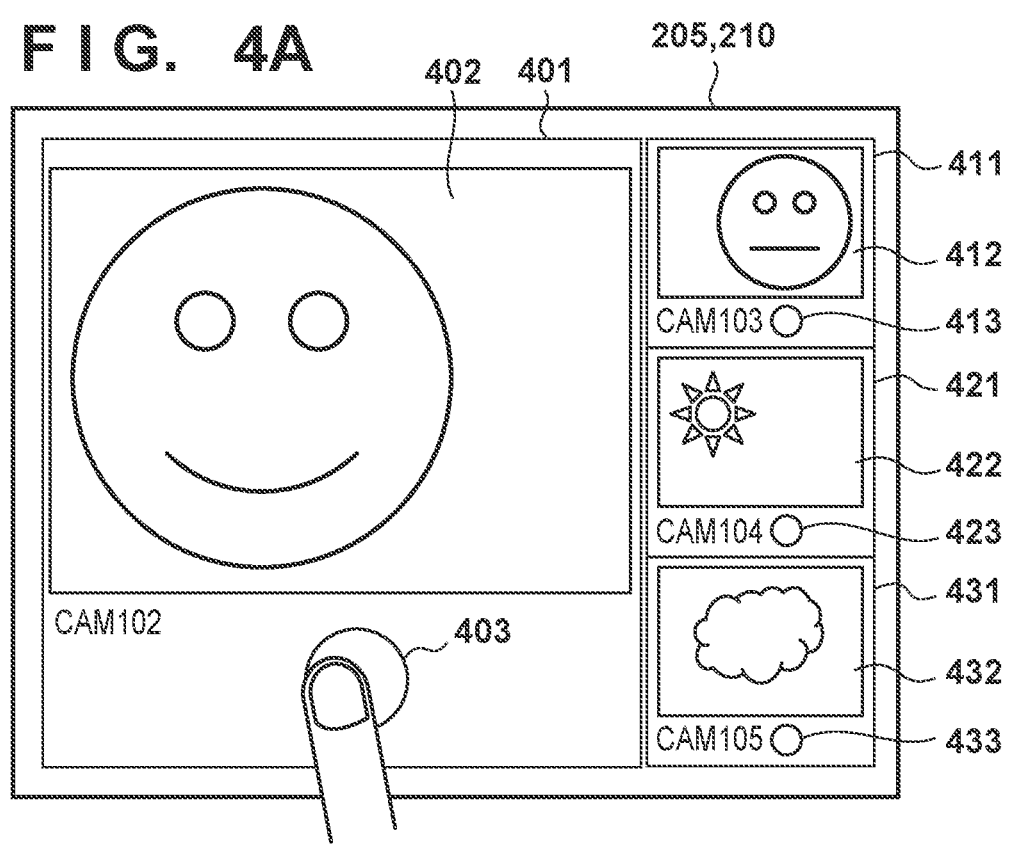
FIGS. 4A and 4B are diagrams illustrating a display example of the display apparatus in a first embodiment.

FIG. 4A is a diagram illustrating a display example of the display 205 of the display apparatus 100 on which the touch panel 210 is disposed at the time of remote photographing.

On the display 205 of the display apparatus 100, control screens of the four imaging apparatuses 102 to 105 connected via the network 101 are displayed. The control screen 401 of the imaging apparatus 102, which is the main imaging apparatus, is displayed in a large size, and the control screens of the other imaging apparatuses 103, 104, and 105 are displayed as control screens 411, 421, and 431 beside the control screen 401.

When the imaging apparatus 102 to 105 starts the live view photographing operation, the live view images acquired by the imaging apparatus 102 to 105 are displayed on the live view display screens 402, 412, 422, and 432 in the respective control screens.

On the control screens 401, 411, 421, and 431, operation icons 403, 413, 423, and 433 are displayed as operation units for instructing a photographing command. When the user touches the display area of the icon, the display is changed to a display in which the button is pressed, and the user can recognize that the button is pressed similarly to the mechanical button.

When detecting that a touch-down is performed on the operation icon 403 by the user, the CPU 201 of the display apparatus 100 transmits a photographing start command (start command of the imaging operation) to the imaging apparatus 102. Thereafter, when touch-up of the operation icon 403 is detected, a photographing stop command is transmitted to the imaging apparatus 102. The operation icons 413, 423, and 433 also issue similar instructions to the imaging apparatuses.

Figure 4B:
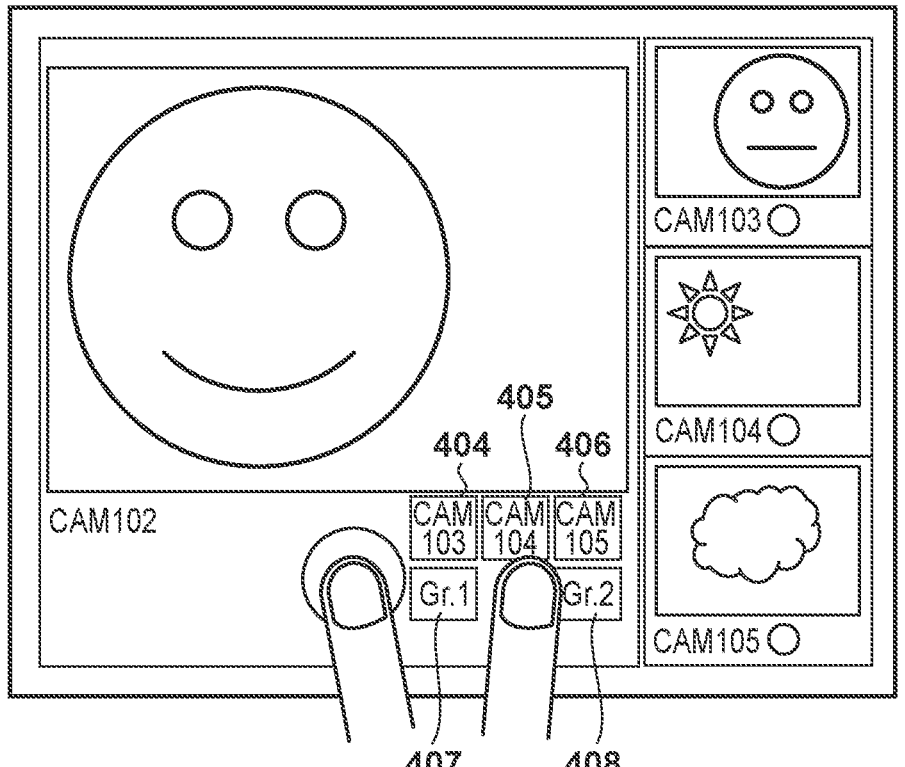

Here, when the user touches the operation icon 403 and touches an arbitrary area of the display 205 (an area that can be reached by the user with the same hand that is touching the operation icon 403) with another finger in the touch-on state, the operation icons 404 to 408 are displayed as the imaging apparatus selection menu in the vicinity of the touched area as illustrated in FIG. 4B. The imaging apparatuses 103 to 105 excluding the imaging apparatus 102 are associated with the operation icons 404 to 408. Then, when the user performs a touch-down on any of the displayed operation icons 404 to 408, a photographing start command is transmitted to the imaging apparatus associated with the operation icon.

For example, assume that a shutter opportunity comes to the imaging apparatus 103 during photographing by the imaging apparatus 102, and a situation in which it is desired to start the photographing action of the imaging apparatus 103 while continuing the photographing action of the imaging apparatus 102 occurs. In this case, the user performs a touch-down on an arbitrary area of the display 205 with another finger to display the imaging apparatus selection menu while maintaining the touch-on state for the operation icon 403. Then, the finger used for the touch-down operation serving as a trigger for displaying the imaging apparatus selection menu is released while maintaining the touch-on state for the operation icon 403, and then the operation icon 404 of the displayed imaging apparatus selection menu is touched with the same finger while maintaining the touch-on state for the operation icon 403. As a result, the photographing of the imaging apparatus 103 can be started while continuing the photographing action of the imaging apparatus 102.

Note that, in the above description, a case where the operation icon 404 of the imaging apparatus selection menu is touched with the same finger after the finger used for the touch-down operation serving as a trigger for displaying the imaging apparatus selection menu is released has been described as an example, but the present invention is not limited thereto. For example, in the above description, the selection may be accepted by moving the finger to above the operation icon 404 to 408 of the imaging apparatus selection menu (drag operation) without releasing the finger used for the touch-down operation serving as a trigger for displaying the imaging apparatus selection menu, and bringing the operation icon 404 to 408 to a touch-on state. Alternatively, the selection of the operation icon 404 to 408 may be accepted by touching the operation icon 404 to 408 of the imaging apparatus selection menu with another finger without releasing the finger used for the touch-down operation serving as a trigger for displaying the imaging apparatus selection menu.

Figure 5A:
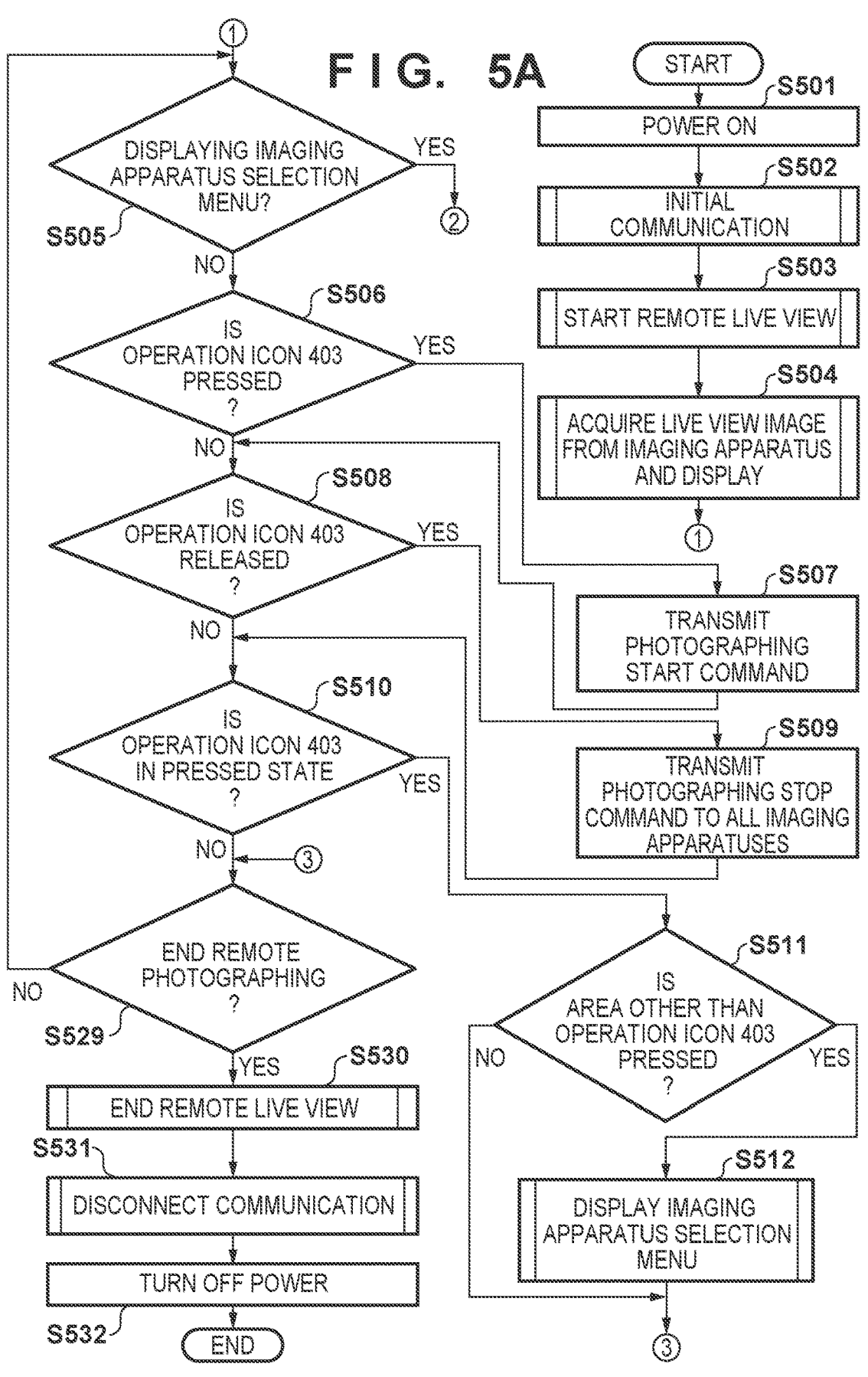
Figure 5B:
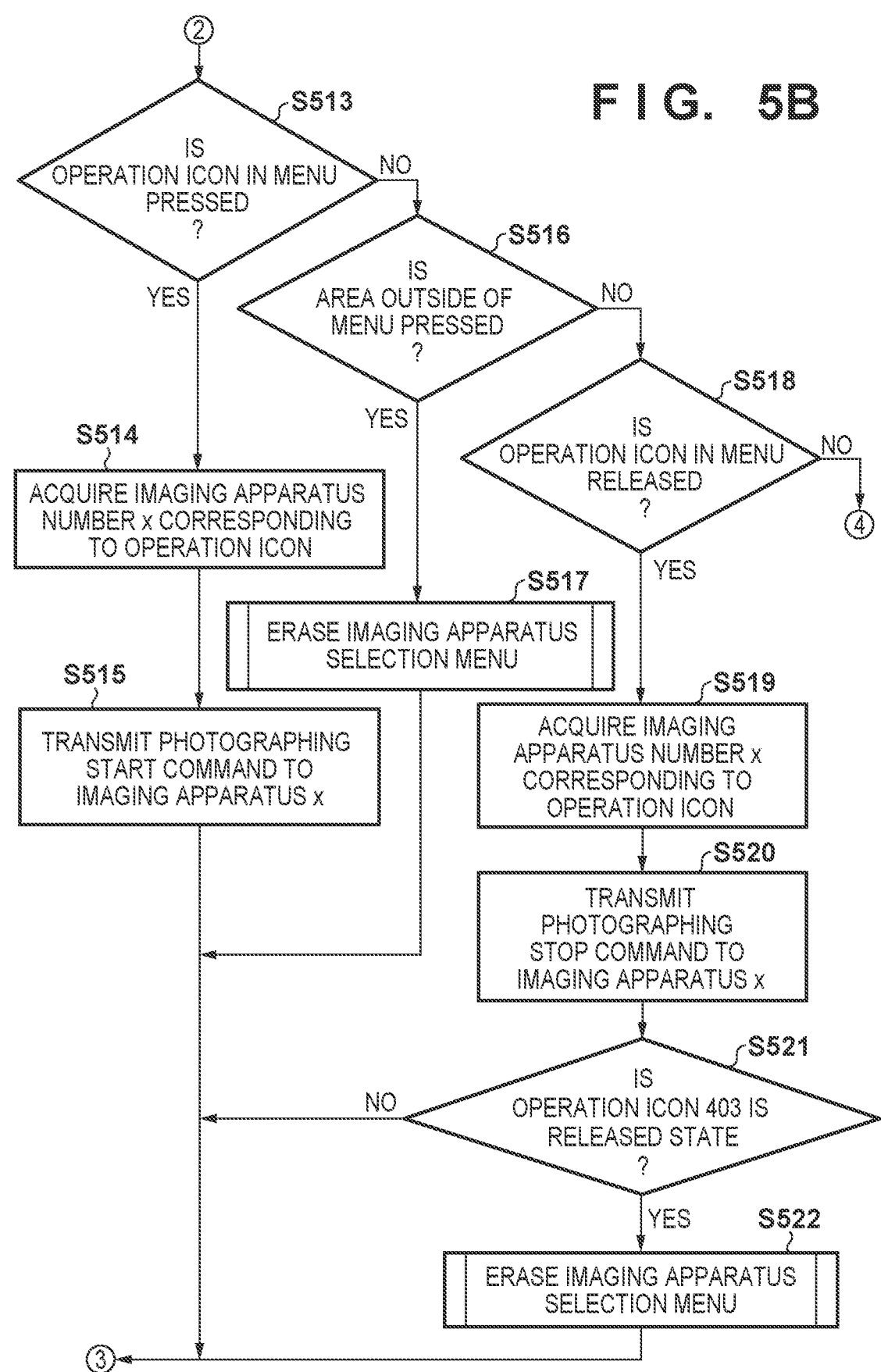

FIGS. 5A to 5C are flowcharts showing an operation of release control in a case where remote photographing is performed in the display apparatus 100. This process is realized by the CPU 201 executing a program read from the nonvolatile memory 203.

In step S501, the user operates a power supply button (not illustrated) of the display apparatus 100 to turn the display apparatus 100 to the power ON state.

In step S502, the CPU 201 starts communication with the imaging apparatus 102 to 105 connected via the communication I/F 208, and transmits and receives information of the apparatuses to and from each other. In the remote photographing, since a photographing instruction is given from the display apparatus 100, the CPU 201 receives the current setting information from each imaging apparatus in step S502. Here, the setting information is photographing setting information such as a setting state of photographing mode and a setting state of white balance, information of a live view state, and the like. In a case where the setting of each imaging apparatus is changed by operating the display apparatus 100, each imaging apparatus notifies the display apparatus 100 of the update of the setting information of each imaging apparatus.

In step S503, the CPU 201 notifies each imaging apparatus of the start of the remote live view, and each imaging apparatus starts the live view. When the live view of each imaging apparatus is started, each imaging apparatus periodically transmits a live view image to the display apparatus 100.

In step S504, the CPU 201 displays the live view image acquired from each imaging apparatus on the live view display screens 402, 412, 422, and 432 of the display 205, and updates the live view display in accordance with the periodically received live view images.

In step S505, the CPU 201 determines whether or not the imaging apparatus selection menu is displayed. When the imaging apparatus selection menu is displayed, the CPU 201 proceeds the process to step S513, and when the imaging apparatus selection menu is not displayed, the CPU 201 proceeds the process to step S506.

In step S506, the CPU 201 determines whether or not any one of the operation icons 403, 413, 423, and 433 displayed on the display 205 has been pressed, that is, whether or not the touch-down has been performed. When the touch-down has been performed, the CPU 201 proceeds the process to step S507, and when the touch-down has not been performed, the CPU 201 proceeds the process to step S508.

Note that, description is made below assuming that the operation icon 403 has been operated, but even in a case where the operation icon 413, 423, or 433 has been operated, similar process is performed only by changing the imaging apparatus to be controlled.

In step S507, the CPU 201 transmits a photographing start command to the imaging apparatus 102 corresponding to the operation icon 403 on which the touch-down has been performed in step S506 via the communication I/F 208.

In step S508, the CPU 201 determines whether or not the operation icon 403 has been released, that is, whether or not the touch-up has been performed. When the touch-up has been performed, the CPU 201 proceeds the process to step S509, and when the touch-up has not been performed, the CPU 201 proceeds the process to step S510.

In step S509, the CPU 201 transmits a photographing stop command to the imaging apparatus 102 corresponding to the operation icon 403 touched up in step S508 via the communication I/F 208.

In the processes so far, control is performed to cause the imaging apparatus 102 to perform continuous photographing and to stop photographing by touching up during a period in which a touch-down is being performed on the operation icon 403.

In step S510, the CPU 201 determines whether or not the operation icon 403 is in the state of being currently pressed, that is, in the touch-on state. The CPU 201 proceeds the process to step S511 when in the touch-on state, and proceeds the process to step S529 when not in the touch-on state.

In step S511, the CPU 201 determines whether or not an area other than the operation icon 403 has been touched down. When a touch-down is performed on an area other than the operation icon 403, the CPU 201 proceeds the process to step S512, and otherwise proceeds the process to step S529.

In step S512, the CPU 201 displays an operation icon 404 to 408 as an imaging apparatus selection menu in the vicinity of the area touched in step S511.

As described above, when the user performs a touch-down on the operation icon 403 and desires to perform photographing with another imaging apparatus during photographing with the imaging apparatus 102, the user performs a touch-down on an arbitrary area with another finger while performing a touch-down on the operation icon 403. As a result, an imaging apparatus selection menu can be displayed.

In step S513, the CPU 201 determines whether or not a touch-down has been performed on any of the operation icons 404 to 408 in a state where the imaging apparatus selection menu is being displayed. When the touch-down has been performed, the CPU 201 proceeds the process to step S514, and when the touch-down has not been performed, the CPU 201 proceeds the process to step S516.

In step S514, the CPU 201 acquires the imaging apparatus number corresponding to the operation icon 404 to 408 on which the touch-down was performed. For example, in a case where a touch-down is performed on the operation icon 404 in FIG. 4B, the imaging apparatus number 103 can be acquired.

In step S515, the CPU 201 transmits an imaging start command to the imaging apparatus having the number acquired in step S514 via the communication I/F 208.

In step S516, the CPU 201 determines whether or not a touch-down has been performed on an area outside the imaging apparatus selection menu. When the touch-down has been performed, the CPU 201 proceeds the process to step S517, and when the touch-down has not been performed, the CPU 201 proceeds the process to step S518.

In step S517, the CPU 201 erases the imaging apparatus selection menu. In steps S516 and S517, when a touch-down is performed on an area outside the imaging apparatus selection menu in a state where the imaging apparatus selection menu is displayed, it is considered that the user has an intention to erase the imaging apparatus selection menu.

In step S518, the CPU 201 determines whether or not a touch-up has been performed on any of the operation icons 404 to 408 in the imaging apparatus selection menu. When the touch-up has been performed, the CPU 201 proceeds the process to step S519, and when the touch-up has not been performed, the CPU 201 proceeds the process to step S523.

In step S519, the CPU 201 acquires the imaging apparatus number corresponding to the operation icon 404 to 408 on which the touch-up has been performed.

In step S520, the CPU 201 transmits an imaging stop command to the imaging apparatus having the number acquired in step S519 via the communication I/F 208.

In step S521, the CPU 201 determines whether or not the operation icon 403 is in a touch-off state when a touch-up has been performed on any of the operation icons 404 to 408 in the imaging apparatus selection menu in step S518. When the touch-off has been performed, the CPU 201 determines that there is no operation icon on which the photographer is performing a touch-on at this time point, that is, all the imaging apparatuses are not performing the photographing action, and proceeds the process to step S522 to erase the imaging apparatus selection menu. When the touch-off has not been performed, any imaging apparatus is still performing the photographing action, and thus the CPU 201 keeps the imaging apparatus selection menu displayed and proceeds the process to step S529.

In step S522, the CPU 201 erases the imaging apparatus selection menu.

In step S523, the CPU 201 determines whether or not a touch-down has been performed on the operation icon 403. This allows control of photographing start and stop of the imaging apparatus 102 by performing a touch-down and touch-up on the operation icon 403 in a state where a touch-on is performed on the operation icon 404 to 408 in the imaging apparatus selection menu. As a result, it becomes possible to cause the imaging apparatus 102 to perform the photographing action intended by the photographer. When a touch-down is performed on the operation icon 403, the CPU 201 proceeds the process to step S524, and when a touch-down on the operation icon is not performed, the CPU 201 proceeds the process to step S525.

In step S524, the CPU 201 transmits a photographing start command to the imaging apparatus 102 corresponding to the operation icon 403 on which the touch-down is performed in step S523 via the communication I/F 208.

In step S525, the CPU 201 determines whether or not a touch-up has been performed on the operation icon 403. When the touch-up has been performed, the CPU 201 proceeds the process to step S526, and when the touch-up has not been performed, the CPU 201 proceeds the process to step S529.

In step S526, the CPU 201 transmits a photographing stop command to the imaging apparatus 102 corresponding to the operation icon 403 on which the touch-up is performed in step S525 via the communication I/F 208.

In step S527, the CPU 201 determines whether or not the operation icons 404 to 408 in the imaging apparatus selection menu are in a touch-off state when a touch-up is performed on the operation icon 403 in step S525. When the touch-off has been performed, the CPU 201 determines that there is no operation icon on which the photographer is performing a touch-on at this time point, that is, all the imaging apparatuses are not performing the photographing action, and proceeds the process to step S528 to erase the imaging apparatus selection menu. When the touch-off has not been performed, any imaging apparatus is still performing the photographing action, and thus the CPU 201 keeps the imaging apparatus selection menu displayed and proceeds the process to step S529.

In step S528, the CPU 201 erases the imaging apparatus selection menu.

In step S529, the CPU 201 determines whether or not the end of the remote photographing has been instructed by the user. When the end of the remote photographing is instructed, the CPU 201 proceeds the process to step S530, and otherwise returns the process to step S505. During the remote photographing, the processes of steps S505 to S528 are repeatedly performed.

In step S530, the CPU 201 closes the live view display screens 402, 412, 422, and 432, notifies the imaging apparatuses 102 to 105 of the end of the live view, and ends the remote live view.

In step S531, the CPU 201 disconnects the communication, turns OFF the power in step S532, and ends the process.

As described above, according to the present embodiment, even in a situation where the operation icon 403 and the operation icons 413, 423, and 433 are arranged at locations physically separated from each other due to display layout restrictions or the like, and it is difficult to operate with one hand, it is possible to simultaneously perform photographing by a plurality of imaging apparatuses without releasing the finger from the operation icon 403 (without interrupting the photographing action of the imaging apparatus 102).

Note that a plurality of imaging apparatuses may be treated as a group and the group may be associated with an operation icon.

For example, the imaging apparatus 103 and the imaging apparatus 104 may be assigned as a group (Gr. 1) to the operation icon 407, and a photographing start command may be simultaneously transmitted to the imaging apparatus 103 and the imaging apparatus 104 by pressing the operation icon 407. In FIG. 4B, the operation icons 407 and 408 are given a group function.

In addition, the number of operation icons in the imaging apparatus selection menu is five, 404 to 408 in FIG. 4B. However, a setting function of changing the number to an arbitrary number, setting the arrangement of the operation icons to an arbitrary layout, or setting the order of the imaging apparatuses and groups to be assigned to each operation icon 404 to 408 may be provided.

Furthermore, in the present embodiment, the control operation corresponding to the operation icon is start and stop of photographing, but the control operation may be assigned to control that requires continuous operation such as start and stop of autofocus control or start and stop of automatic exposure control.

Moreover, in the present embodiment, the touch down of an area other than the operation icon 403 is used as a means for determining whether or not to display the imaging apparatus selection menu, but other operations may be used as long as the operation can be performed while continuing the operation of the operation icon 403. For example, the imaging apparatus selection menu may be displayed when the operation icon 403 is pressed for longer than or equal a certain period of time.

Furthermore, it is also assumed that items for other operations other than the operation icon 403 are displayed. Then, the imaging apparatus selection menu may be similarly displayed as long as the other items are the items to be continuously controlled while a touch-on is being performed thereon. On the other hand, in a case where the other items are items that refer only to touch-down or touch-up (e.g., an on/off switching switch of some function or the like.), the user does not need to continue the touch-on state for the operation, and thus the imaging apparatus selection menu may not be displayed. Alternatively, in order to unify the sense of operation, the imaging apparatus selection menu may be displayed even when the other item is an item that refers to only "touch-down" or "touch-up".

A system that controls a plurality of apparatuses as in the present embodiment may have a function of disabling operations other than the control screen 401 of the imaging apparatus 102 that performs main photographing in order to prevent erroneous operations. However, even when this function is enabled, the control from the imaging apparatus selection menu may not be disabled, and the control may be enabled as an exception. This is because it is considered that the intention of the photographer is clear in the control of displaying the imaging apparatus selection menu and performing photographing of other than the imaging apparatus 102.

Furthermore, when the imaging apparatus selection menu is displayed, there may be a case where the menu overlaps the live view display already displayed as the background. In this case, whether or not the icon of the imaging apparatus selection menu and the live view display overlap is determined, and when the icon and the live view display overlap, the display position of the imaging apparatus selection menu may be moved within a preset range.

Furthermore, a case where the live view display and the imaging apparatus selection menu are still overlapped even if the display position of the imaging apparatus selection menu is moved within a preset range is considered. In this case, the image processing unit 306 may perform transparent processing on the imaging apparatus selection menu and then superimpose the menu on the live view display.

Note that, in the above embodiment, description has been made that the display apparatus 100 operates (controls) a plurality of imaging apparatuses, but the present invention is not limited thereto, and the display apparatus 100 may be used to operate (control) a plurality of devices other than the imaging apparatus.

Second Embodiment

Next, an imaging system that controls a plurality of imaging apparatuses from one display apparatus according to a second embodiment of the present invention will be described. In the present embodiment, a system configuration and an apparatus configuration are the same as those in the first embodiment. Detailed description on processes equivalent to those of the first embodiment will be omitted. In the second embodiment, a case where a live view image of the imaging apparatus 102 is displayed on the entire screen of the display 205 of the display apparatus 100 will be described.

FIG. 6A is a diagram illustrating a state in which a live view image of the imaging apparatus 102 is displayed on the entire screen of the display 205 of the display apparatus 100 in remote photographing. Note that a touch panel 210 is disposed on the surface of the display 205 as in the first embodiment.

In the present embodiment, a photographing start command to the imaging apparatus 102 can be transmitted by touching an arbitrary portion in the entire area of the live view display screen 601 excluding the full-screen stop icon 602. Similarly to the operation icon 403 in the first embodiment, the continuous photographing of the imaging apparatus 102 is performed while a touch-on is performed on the live view display screen, and the photographing stop command is transmitted when a touch-up is performed on the live view display screen.

In the present embodiment as well, the imaging apparatuses 103 to 105 and the display apparatus 100 are connected via the communication I/F 208. Normally, in a case where control is performed on the imaging apparatus 103 to 105, the full-screen stop icon 602 is once touched to stop the full-screen display state, and each imaging apparatus is controlled after the normal control screens 401, 411, 421, and 431 are displayed. This is the normal control.

On the other hand, in the present embodiment, the following operation can be performed in addition to the normal control described above. That is, as illustrated in FIG. 6A, in a state where a touch-on is performed on an arbitrary place on the live view display screen (in a state where the photographing operation of the imaging apparatus 102 is continued), when a touch-down is performed on another place (a position that can be reached by the user with the same hand that is touching the arbitrary place), the operation icons 603 to 607 can be displayed as the imaging apparatus selection menu as illustrated in FIG. 6B. The processing contents in a case where the operation icons 603 to 607 are operated are the same as those in the first embodiment.

Figure 7B:
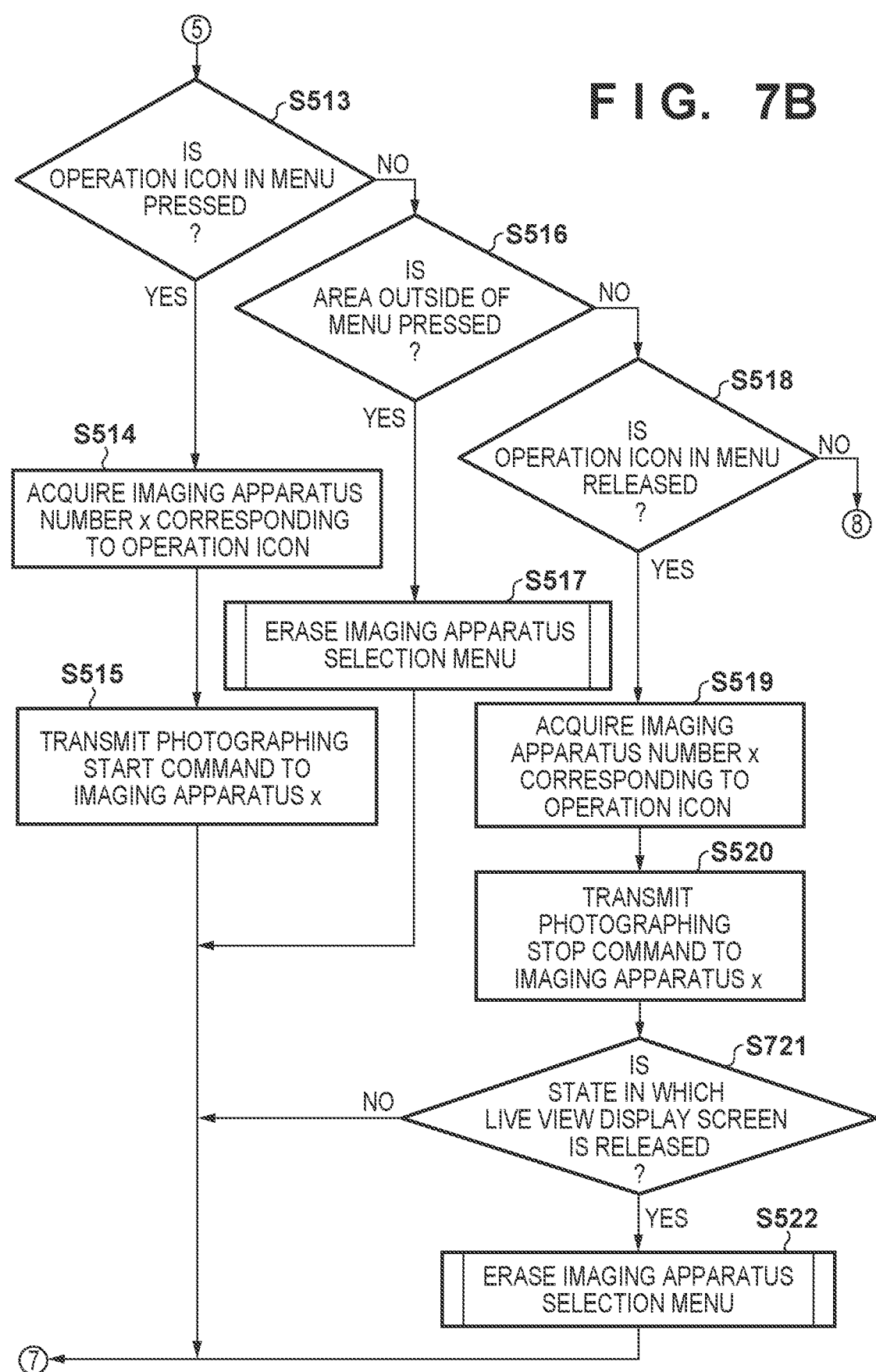
Figure 7C:
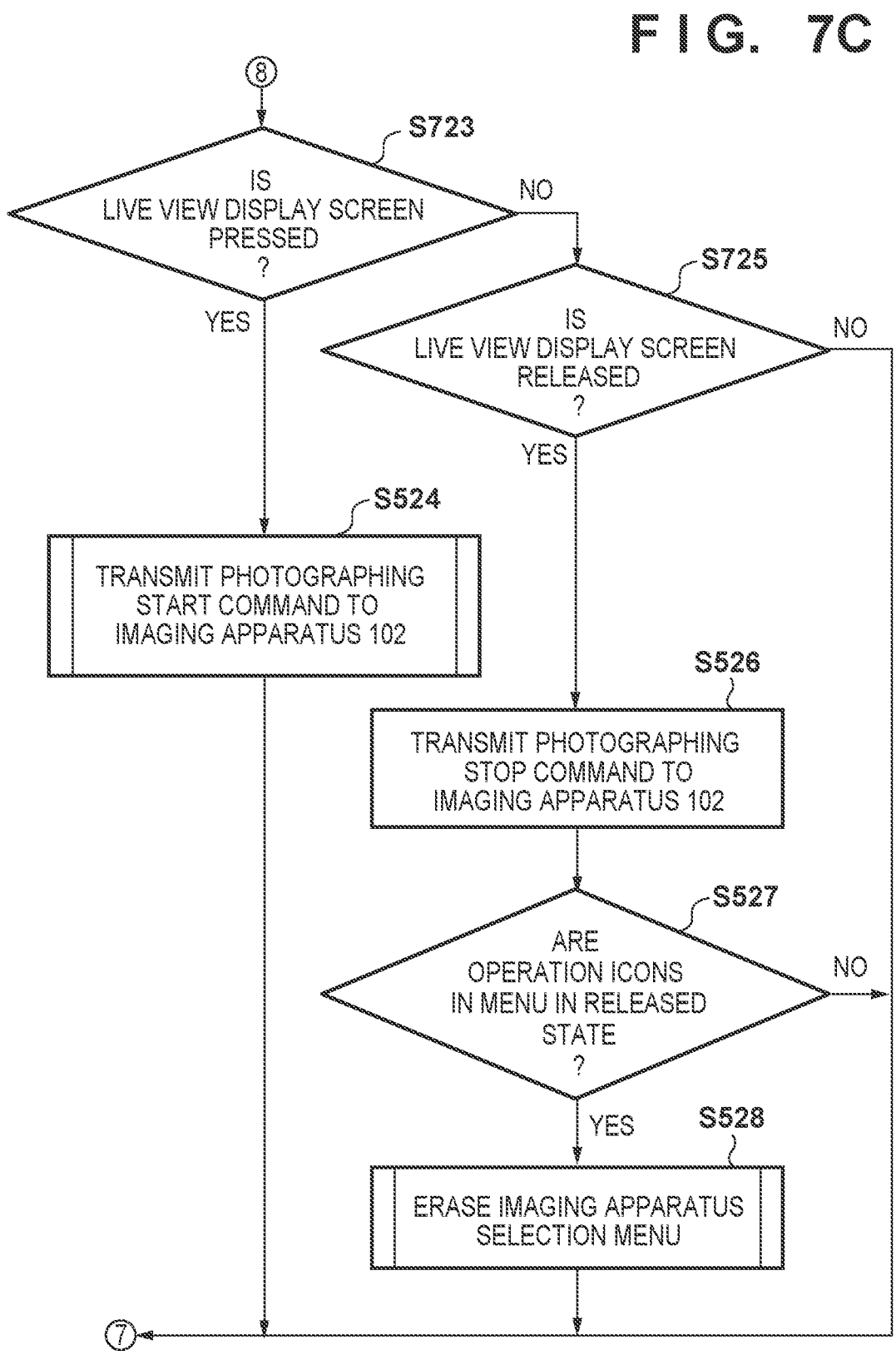

FIGS. 7A to 7C are flowcharts showing an operation of release control in a case where remote photographing is performed in the display apparatus 100. This process is realized by the CPU 201 executing a program read from the nonvolatile memory 203. Note that, in FIGS. 7A to 7C, the same step numbers are given to steps that perform the same process as in FIGS. 5A to 5C illustrating the operation of the first embodiment, and description thereof will be omitted.

Since steps S501 and S502 are similar to the processes of S501 and S502 of the flowchart of the first embodiment in FIGS. 5A to 5C, the description thereof will be omitted.

In step S703, the CPU 201 notifies the imaging apparatus 102 of the start of the remote live view, and the imaging apparatus 102 starts the live view. When the live view of each imaging apparatus 102 is started, each imaging apparatus 102 periodically transmits a live view image to the display apparatus 100. Since the imaging apparatuses 103 to 105 other than the imaging apparatus 102 do not require a remote live view image, the live view is not started.

In step S704, the CPU 201 displays the live view image acquired from the imaging apparatus 102 on the live view display screen 601 of the display 205, and updates the live view display in accordance with the live view image received periodically.

Since step S505 is similar to the process of S505 in the flowchart of the first embodiment in FIGS. 5A to 5C, the description thereof will be omitted.

In step S706, the CPU 201 determines whether or not the touch-down has been performed on the live view display screen. When the touch-down has been performed, the CPU 201 proceeds the process to step S507, and when the touch-down has not been performed, the CPU 201 proceeds the process to step S708.

Since step S507 is similar to the process of S507 in the flowchart of the first embodiment in FIGS. 5A to 5C, description thereof will be omitted.

In step S708, the CPU 201 determines whether or not a touch-up has been performed on the live view display screen. When the touch-up has been performed, the CPU 201 proceeds the process to step S509, and when the touch-up has not been performed, the CPU 201 proceeds the process to step S710.

Since step S509 is similar to the process of S509 in the flowchart of the first embodiment in FIGS. 5A to 5C, the description thereof will be omitted.

In step S710, the CPU 201 determines whether or not the live view display screen is in a state of currently being pressed, that is, the touch-on state. The CPU 201 proceeds the process to step S711 when in the touch-on state, and proceeds the process to step S529 when not in the touch-on state.

In step S711, the CPU 201 determines whether a touch-down has been performed on the live view display screen by another operation while the touch-on state is set on the live view display screen. In a case where a touch-down is performed on the live view display screen, the CPU 201 determines that there is an intention to cause any of the imaging apparatuses 103 to 105 to perform photographing, and proceeds the process to step S712. When the touch-down has not been performed, the process proceeds to step S529.

In step S712, the CPU 201 displays operation icons 603 to 607 as an imaging apparatus selection menu in the vicinity of the area in which the touch-down is performed in step S711.

That is, in a case where the user desires to perform photographing with another imaging apparatus while the user performs a touch-down on the live view display screen and performs photographing with the imaging apparatus 102, the user performs a touch-down on the live view display screen with another finger while performing a touch-down on the live view display screen. As a result, an imaging apparatus selection menu can be displayed.

Since steps S513 to S520 are similar to the processes of S513 to S520 in the flowchart of the first embodiment in FIGS. 5A to 5C, the description thereof will be omitted.

In step S721, when a touch-up is performed on any of the operation icons 603 to 607 in the imaging apparatus selection menu in step S518, the CPU 201 determines whether or not the live view display screen is in a touch-off state. When the touch-off has been performed, the CPU 201 determines that there is no operation on which the photographer is performing a touch-on at this time point, that is, all the imaging apparatuses are not performing the photographing action, and proceeds the process to step S522 to erase the imaging apparatus selection menu. When the touch-off has not been performed, any imaging apparatus is still performing the photographing action, and thus the CPU 201 keeps the imaging apparatus selection menu displayed and proceeds the process to step S529.

Since step S522 is similar to the process of S522 in the flowchart of the first embodiment in FIGS. 5A to 5C, the description thereof will be omitted.

In step S723, the CPU 201 determines whether or not the touch-down has been performed on the live view display screen. This allows control of photographing start and stop of the imaging apparatus 102 by touch-up or touch-down of the live view display screen in a state where a touch-on is performed on the operation icon 603 to 607 in the imaging apparatus selection menu. As a result, it becomes possible to cause the imaging apparatus 102 to perform the photographing action intended by the photographer. The CPU 201 proceeds the process to step S524 when a touch-down is performed on the live view display screen, and proceeds the process to step S725 when a touch-down is not performed on the live view display screen.

Since step S524 is similar to the process of S524 in the flowchart of the first embodiment in FIGS. 5A to 5C, the description thereof will be omitted.

In step S725, the CPU 201 determines whether or not a touch-up has been performed on the live view display screen. When the touch-up has been performed, the CPU 201 proceeds the process to step S526, and when the touch-up has not been performed, the CPU 201 proceeds the process to step S529.

Since steps S526 to S532 are similar to the processes of S526 to S532 in the flowchart of the first embodiment in FIGS. 5A to 5C, the description thereof will be omitted.

As described above, according to the present embodiment, even in a state where the live view of the imaging apparatus 102 is full-screen displayed and the operation icons of the other imaging apparatuses 103 to 105 are not displayed, the photographing of the imaging apparatuses 103 to 105 can be started without interrupting the photographing action of the imaging apparatus 102.

As described above, even in a state where the live view image of the imaging apparatus 102 is displayed on the entire screen of the display apparatus 100 and the control icons of other imaging apparatuses are not displayed, photographing of a plurality of imaging apparatuses can be simultaneously performed without interrupting the photographing action of the imaging apparatus 102.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-025529, filed Feb. 21, 2023, which is hereby incorporated by reference herein in its entirety.

What is claimed is:

1. A display apparatus that is communicable with a plurality of devices, the display apparatus comprising:
   a display having a touch panel; and
   at least one processor or circuit configured to function as:
   a control unit configured to control to transmit an instruction for causing a first device, which is an imaging apparatus, of the plurality of devices to perform a first operation that is an imaging operation when a user touches a first position of the touch panel, and cause the display to display a menu for selecting a second device, which is an imaging apparatus, different from the first device from the plurality of devices when the user touches a second position of the touch panel while touching the first position of the touch panel, wherein the control unit performs a control to transmit an instruction for causing the second device to perform a second operation that is an imaging operation in response to the user selecting the second device from the menu, and wherein the control unit continues the imaging operation while the user is touching the first position, and stops the imaging operation when the user stops touching the first position.

2. The display apparatus according to claim 1, wherein the second position is a position of the touch panel reached by the user with a same hand that is touching the first position.

3. The display apparatus according to claim 1, wherein the control unit performs a control to cause the display to display the menu in a vicinity of the second position.

4. The display apparatus according to claim 1, wherein the first position is a position where an operation icon is displayed on the display.

5. The display apparatus according to claim 1, wherein the control unit erases the display of the menu when the user touches an area of the touch panel other than an area where the menu is displayed.

6. The display apparatus according to claim 1, wherein the control unit moves the menu when the menu overlaps an image displayed on the display.

7. The display apparatus according to claim 1, wherein the control unit performs transparent processing on the menu when the menu overlaps with an image displayed on the display.

8. A method for controlling a display apparatus including a display having a touch panel and being communicable with a plurality of devices, the method comprising:

controlling to transmit an instruction for causing a first device, which is an imaging apparatus, among the plurality of devices to perform a first operation that is an imaging operation when a user touches a first position of the touch panel, and cause the display to display a menu for selecting a second device, which is an imaging apparatus, different from the first device from the plurality of devices when the user touches a second position of the touch panel while touching the first position of the touch panel, wherein in the controlling, a control to transmit an instruction for causing the second device to perform a second operation that is an imaging operation is performed in response to the user selecting the second device from the menu, and wherein in the controlling, the imaging operation is continued while the user is touching the first position, and the imaging operation is stopped when the user stops touching the first position.

9. A non-transitory computer-readable storage medium storing a program for causing a computer to execute a method for controlling a display apparatus including a display having a touch panel and being communicable with a plurality of devices, the method comprising:

controlling to transmit an instruction for causing a first device, which is an imaging apparatus, among the plurality of devices to perform a first operation that is an imaging operation when a user touches a first position of the touch panel, and cause the display to display a menu for selecting a second device, which is an imaging apparatus, different from the first device from the plurality of devices when the user touches a second position of the touch panel while touching the first position of the touch panel, wherein in the controlling, a control to transmit an instruction for causing the second device to perform a second operation that is an imaging operation is performed in response to the user selecting the second device from the menu, and wherein in the controlling, the imaging operation is continued while the user is touching the first position, and the imaging operation is stopped when the user stops touching the first position.

* * * * *